US008769102B1

(12) United States Patent
Zhou et al.

(10) Patent No.: US 8,769,102 B1
(45) Date of Patent: Jul. 1, 2014

(54) VIRTUAL TESTING ENVIRONMENTS

(75) Inventors: Sharon Zhou, Redmond, WA (US);
Zhengbo Zhou, Redmond, WA (US);
Arturo Quiroz, Bellevue, WA (US);
Brian Vance, Woodinville, WA (US);
James Reardon, Redmond, WA (US);
Roger Wang, Kirkland, WA (US)

(73) Assignee: Google Inc., Mountain View, CA (US)

( * ) Notice: Subject to any disclaimer, the term of this patent is extended or adjusted under 35 U.S.C. 154(b) by 480 days.

(21) Appl. No.: 13/113,597

(22) Filed: May 23, 2011

Related U.S. Application Data

(60) Provisional application No. 61/347,354, filed on May 21, 2010.

(51) Int. Cl.
*G06F 15/173* (2006.01)
*G06F 15/16* (2006.01)

(52) U.S. Cl.
USPC ............ 709/226; 709/223; 709/225; 709/229

(58) Field of Classification Search
USPC ........................... 709/220–223, 225–226, 229
See application file for complete search history.

(56) References Cited

U.S. PATENT DOCUMENTS

| 7,823,185 | B1* | 10/2010 | Seaman et al. | 726/1 |
| 7,908,605 | B1* | 3/2011 | Graupner et al. | 718/104 |
| 8,171,132 | B2* | 5/2012 | Iszlai et al. | 709/224 |
| 8,250,213 | B2* | 8/2012 | Glover et al. | 709/226 |
| 8,468,246 | B2* | 6/2013 | Mays et al. | 709/226 |
| 8,473,627 | B2* | 6/2013 | Astete et al. | 709/225 |
| 2011/0055398 | A1* | 3/2011 | DeHaan et al. | 709/226 |
| 2011/0055588 | A1* | 3/2011 | DeHaan | 713/189 |
| 2011/0055712 | A1* | 3/2011 | Tung et al. | 715/738 |
| 2012/0096165 | A1* | 4/2012 | Madduri et al. | 709/226 |
| 2013/0061221 | A1* | 3/2013 | Anderson et al. | 718/1 |

OTHER PUBLICATIONS

'SAVVIS' [online] "Resource Center" [retrieved on Jan. 3, 2013]. Retrieved from the Internet: URL:http://www.savvis.com/en-US/Info_Center/Documents/SAAS-US-VirtualLab.pdf 7 pages.
'Wikipedia' [online] "Skytap," last modified Aug. 1, 2013, [retrieved on Jan. 3, 2014]. Retrieved from the Internet: URL:http://en.wikipedia.org/wiki/Skytap 2 pages.

(Continued)

*Primary Examiner* — Patrice Winder
(74) *Attorney, Agent, or Firm* — Fish & Richardson P.C.

(57) ABSTRACT

In one aspect, a first request is received at a configuration server for access to a first virtual test environment. The first request is received from a first client device over a network and specifies one or more configuration options associated with the first virtual test environment. It is determined that a user of the first client device belongs to a first group out of multiple groups. A first pool of resources is selected based on the user of the first client device belonging to the first group, wherein the first pool of resources are available to members of the first group but not available to members of a second group out of the multiple groups. A first virtual machine is provisioned using the selected first pool of resources that includes the first virtual test environment, the first virtual test environment including features associated with the one or more configuration options associated with the first virtual test environment. The first client device is provided access to the first virtual test environment.

18 Claims, 12 Drawing Sheets

(56) References Cited

OTHER PUBLICATIONS

Heller, "Skytap puts IT labs in the Cloud," InfoWord, Mar. 18, 2009, 3 pages http://www.infoworld.com/d/developer-world/skytap-puts-it-labs-in-cloud-751.

Kusnetzky, "Skytap and the test lab in the clouds," Virtually Speaking, Apr. 14, 2008, 4 pages http://www.zdnet.com/blog/virtualization/skytap-and-the-test-lab-in-the-clouds/386.

Skytap Inc., "Top ten reasons to transition your IT lab environments to the cloud," 2008, 8 pages, retrieved from the Internet: <URL:http://skytaptc.s3.amazonaws.com/pdf/skytap_whitepaper_10_reasons.pdf>.

Wauters, "SAVVIS to Resell Skytap's Virtual Lab service, Seals Alliance with Parallels," Virtualization.com, Sep. 30, 2008, 3 pages http://virtualization.com/2008/09/30/savvis-to-resell-skytaps-virtual-lab-service-seals-alliance-with-parallels/.

\* cited by examiner

FIG. 9C

Top 20 users with most machines checked out — 902C

| | Users | Hosts |
|---|---|---|
| 1 | User 1 | 12 |
| 2 | User 2 | 9 |
| 3 | User 3 | 7 |
| 4 | User 4 | 6 |
| 5 | User 5 | 6 |
| 6 | User 6 | 5 |
| 7 | User 7 | 4 |
| 8 | User 8 | 4 |
| 9 | User 9 | 4 |
| 10 | User 10 | 3 |
| 11 | User 11 | 3 |
| 12 | User 12 | 3 |
| 13 | User 13 | 3 |
| 14 | User 14 | 3 |
| 15 | User 15 | 3 |
| 16 | User 16 | 3 |
| 17 | User 17 | 3 |
| 18 | User 18 | 3 |
| 19 | User 19 | 3 |
| 20 | User 20 | 3 |

900C

Pending Request Queue — 904C

| Users | Starts Time |
|---|---|

VIRTUAL TESTING ENVIRONMENTS

CROSS-REFERENCE TO RELATED APPLICATIONS

This application claims priority to U.S. Provisional Patent Application Ser. No. 61/347,354, filed on May 21, 2010 and entitled "Virtual Testing Environments." U.S. Provisional Patent Application Ser. No. 61/347,354 is hereby incorporated by reference as if set forth herein in full.

TECHNICAL FIELD

This document relates to virtual testing environments.

BACKGROUND

A user wishing to test a software application in a variety of testing environments may obtain and set-up a number of physical computing resources, such as multiple physical computing devices, to run multiple local testing environments.

SUMMARY

In one aspect, a first request is received at a configuration server for access to a first virtual test environment. The first request is received from a first client device over a network and specifies one or more configuration options associated with the first virtual test environment. It is determined that a user of the first client device belongs to a first group out of multiple groups. A first pool of resources is selected based on the user of the first client device belonging to the first group, wherein the first pool of resources are available to members of the first group but not available to members of a second group out of the multiple groups. A first virtual machine is provisioned using the selected first pool of resources that includes the first virtual test environment, the first virtual test environment including features associated with the one or more configuration options associated with the first virtual test environment. The first client device is provided access to the first virtual test environment.

Aspects may include one or more of the following features.

A second request is received at the configuration server for access to a second virtual test environment, the second request being received from a second client device over a network and specifying one or more configuration options associated with the second virtual test environment. It is determined that a user of the second client device belongs to the second group. A second pool of resources is selected based on the user of the second client device belonging to the second group, wherein the second pool of resources are available to members of the first group and to members of the second group. A second virtual machine is provisioned using the selected second pool of resources that includes the second virtual test environment, the second virtual test environment including features associated with the one or more configuration options associated with the second virtual test environment. The second client device is provided access to the second virtual test environment.

Provisioning the second virtual machine includes determining whether a threshold level of resources in the second pool is available to provision the second virtual machine.

The second request is added to a queue of requests if the threshold level of resources in the second pool is not available to provision the second virtual machine.

Access to the first virtual machine is terminated after expiration of a first allowed access time, the first allowed access time specifying a length of time for which the first client device may access the first virtual machine. Access to the second virtual machine is terminated after expiration of a second allowed access time specifying a length of time for which the second client device may access the second virtual machine. The first allowed access time is longer than the second allowed access time as a result of the first user belonging to the first group and the second user belonging to the second group.

Providing the first client device access to the first virtual test environment includes forwarding, to the first client device, a port associated with the first virtual machine, an internet protocol address associated with the first virtual machine, or a machine name associated with the first virtual machine.

Provisioning the first virtual machine includes instructing a virtual machine host to boot a virtual machine based on an image that corresponds to the configuration options.

The images are stored on the virtual machine host.

Implementations of the variously described techniques may have one or more advantages, such as reducing or eliminating the number of computing resources needed by a given entity to implement a number of testing environments. In some instances, this may reduce the cost and/or time associated with maintaining such testing environments, and thus the costs of developing software application.

The details of one or more implementations are set forth in the accompanying drawings and the description below. Other features and advantages will be apparent from the description and drawings, and from the claims.

DESCRIPTION OF DRAWINGS

FIGS. 9A-D are screen shots of monitoring tools.

DETAILED DESCRIPTION

In some examples, a user of client device might desire to test a client application (or other type of software application) on one or more system configurations (e.g., combinations of an operating system, browser type, central processing unit (CPU) type, and languages, such as English or French). Rather than requiring local access to one or more machines having the desired configuration, the following describes techniques that may provide virtual testing environments. In some cases, providing such virtual test environments may reduce a developer's costs in terms of the number of machines that the developer must maintain, and with regard to the amount of software that the developer must possess in order to set up computing systems in the necessary configurations.

Figure 1:
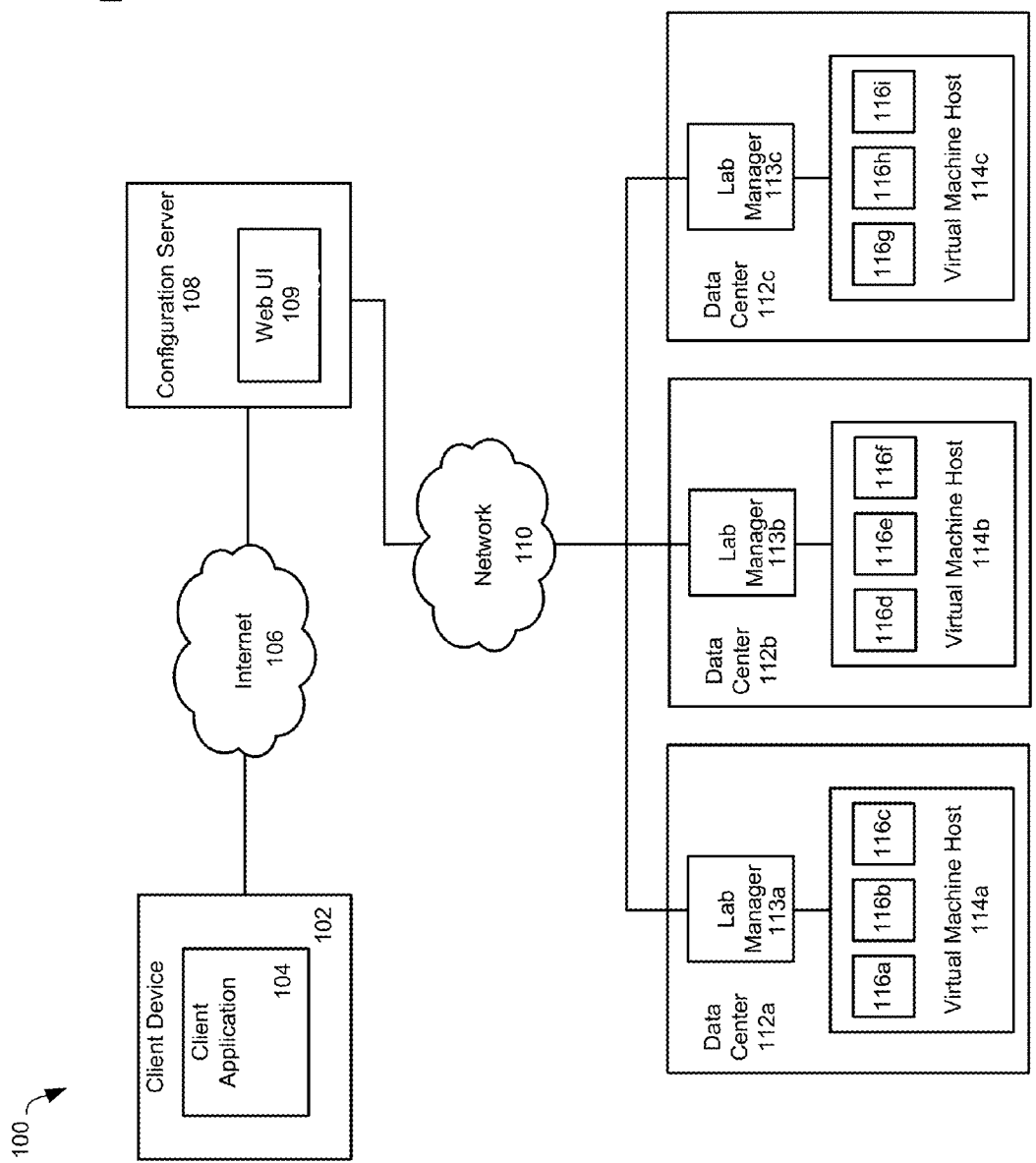
FIG. 1 is a block diagram showing an example of a system for providing virtual test environments.

FIG. 1 is a block diagram showing an example of a system 100 for providing a virtual test environment to a client device 102. As described above, a user of client device 102 (for example, a software application developer) in the system 100 might desire access to one or more computing systems having various configurations in order to test a client (or other) application (e.g., a program under development that needs to be tested on various platforms and under various operating conditions). The system 100 enables the client device 102, using, for example, client application 104, to request and access one or more remotely-located virtual test environments on which to test a client application 104.

The system 100 includes a client device 102 that is connected over a network (e.g., the Internet 106) to a configuration server 108. The client device 102 can communicate across the Internet 106 using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 102 is shown, there can be multiple client devices communicating across the Internet 106 with the configuration server 108, or other services or devices. The client device 102 implements a client application 104 by executing instructions on one or more processing devices. In some implementations, the client application 104 may be implemented by more than one client device. In some implementations, the client application 104 may be implemented as a web browser that accesses and displays the web UI 109 of provided by the configuration server 108 to provide a developer with access to one or more virtual testing environments.

The configuration server 108 communicates over a network 110 to one or more data centers 112a, 112b, and 112c. The data centers 112a-c can be a single computing system or a facility used to house multiple computer systems and associated components, such as telecommunications and storage systems. The data centers 112a-c may also include redundant or backup power supplies, redundant data communications connections, environmental controls (e.g., air conditioning, fire suppression), and security devices. In some examples, the configuration server and one or more data centers are co-located.

The data centers 112a-c house one or more virtual machine hosts 114a, 114b, and 114c, which are each capable of hosting one or more virtual machines 116a-i. In some implementations, the virtual machine hosts 114a, 114b, and 114c are implemented as physical machines, or as software running on physical hardware. The virtual machine hosts 114a, 114b, and 114c are managed by respective lab managers 113a, 113b, and 113c (otherwise referred to as "virtual machine managers"), which can be implemented as hardware, software, or a combination thereof. In some examples, if the virtual machines hosts are physical machines, the lab managers can run on the virtual machine host machines, or can run on a separate physical machine (e.g., another machine within a datacenter).

In some examples, virtual machines 116a-116i are environments, such as a program or operating system, that do not physically exist, but are instead created within another environment. In this context, a virtual machine is sometimes referred to as a "guest" while the environment it runs within is called a "host" (e.g., virtual machine host 114a-c). In general, virtual machines 116a-116i may be created to execute an instruction set different than that of the host environment. Because the virtual machines 116a-116i are separated from the physical resources that they use, the virtual machine hosts 114a-c may be able to dynamically assign those physical resources among the virtual machines 116a-i. A virtual machine may emulate the behavior of a physical computer, and may contain its own virtual (software-based) CPU, physical memory (e.g., random access memory (RAM)) hard disk, and network interface card (NIC).

Figure 2:
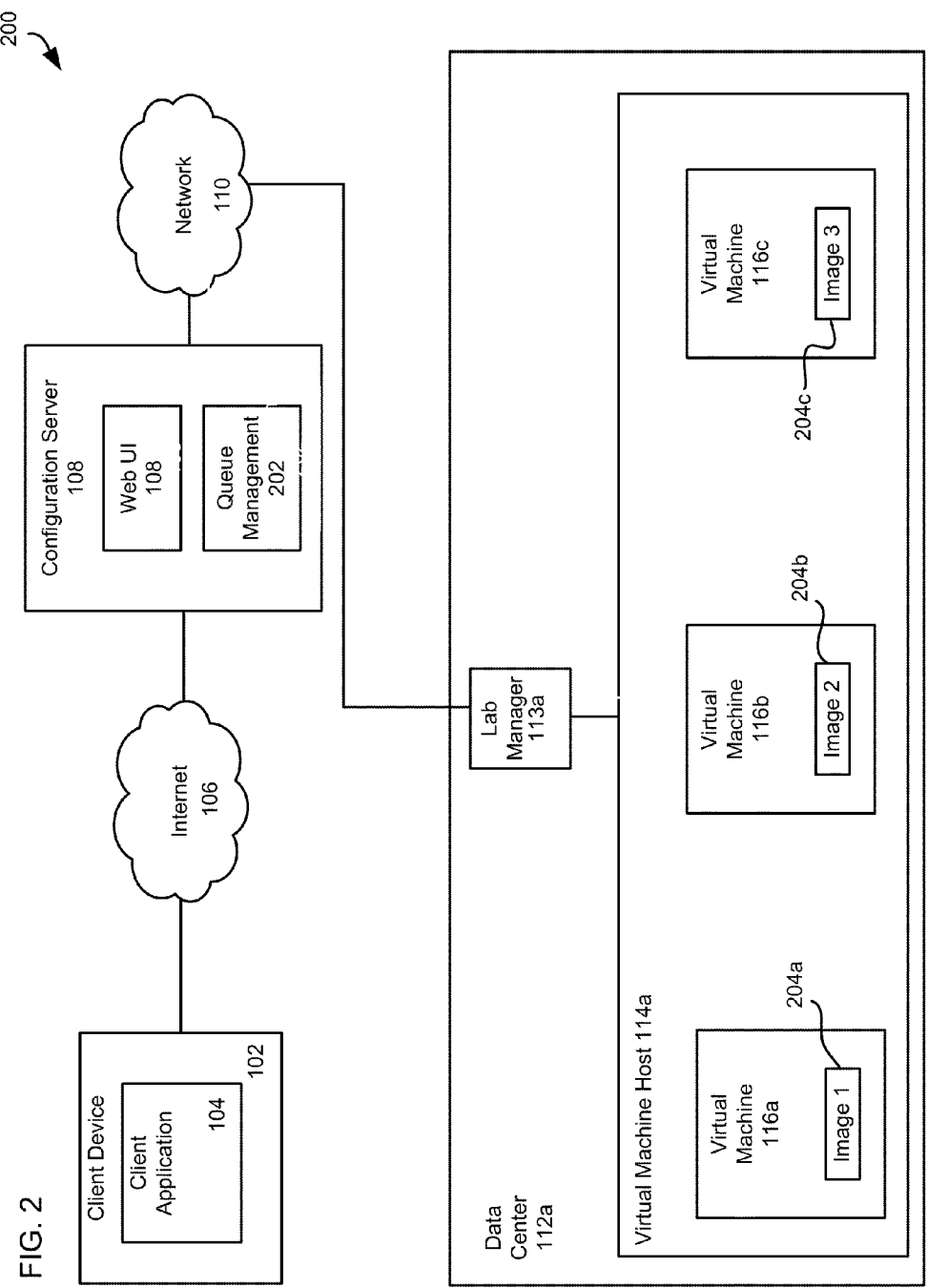
FIG. 2 is a block diagram showing an example of a system for providing virtual test environments.

FIG. 2 is a simplified example of the system 100 shown in FIG. 1, and illustrates a system 200 that includes only a single data center 112a. While the system 200 includes only one data center 112a for the sake of brevity, the system 200 could include any number of data centers connected to the configuration server 108 over the network 110. As shown in FIG. 2, the virtual machines 116a-c are associated with respective images 204a, 204b, 204c. The images 204a-c can represent the state of a computer system (for example, an initial state) stored in a non-volatile form such as a file, and can be loaded into the virtual machine host 114a to implement the respective virtual machines 116a-c. Images can be cached on one or both of the hive manager 113a or the virtual machine host 114a. In some examples, the lab manager 113a can serve as a gateway between the data center 112a and the network 110.

For example, once the virtual machine 116a has loaded image 1 204a, the virtual machine 116a can function as a software-based representation of a physical machine that is configured according to the parameters stored in the image 204a, such as various operating systems, internet browsers, languages, CPUs, memory arrangements, and other programs, settings, and other parameters.

Figure 3:
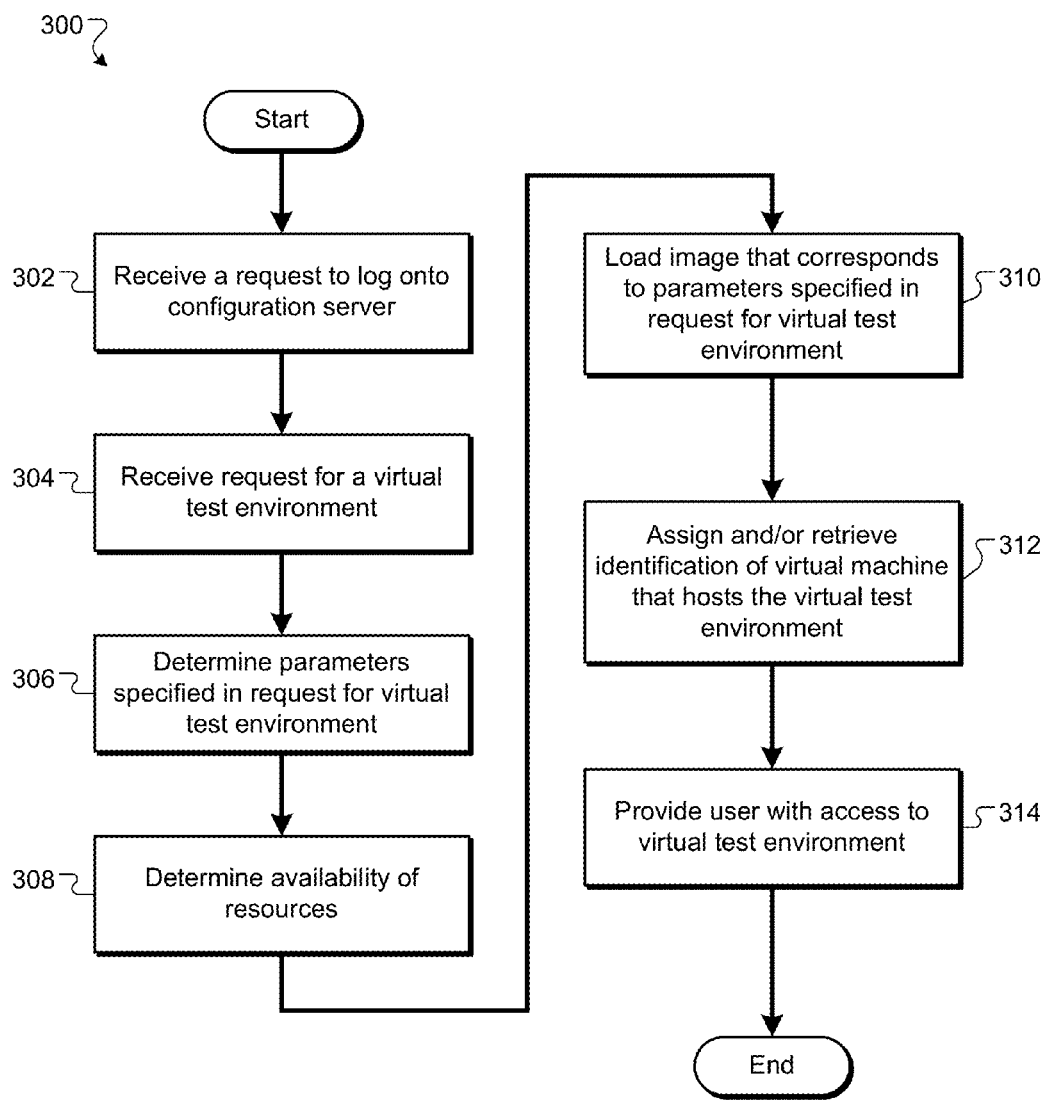
FIG. 3 is a flow chart showing an example of a process for handling requests.
Figure 5:
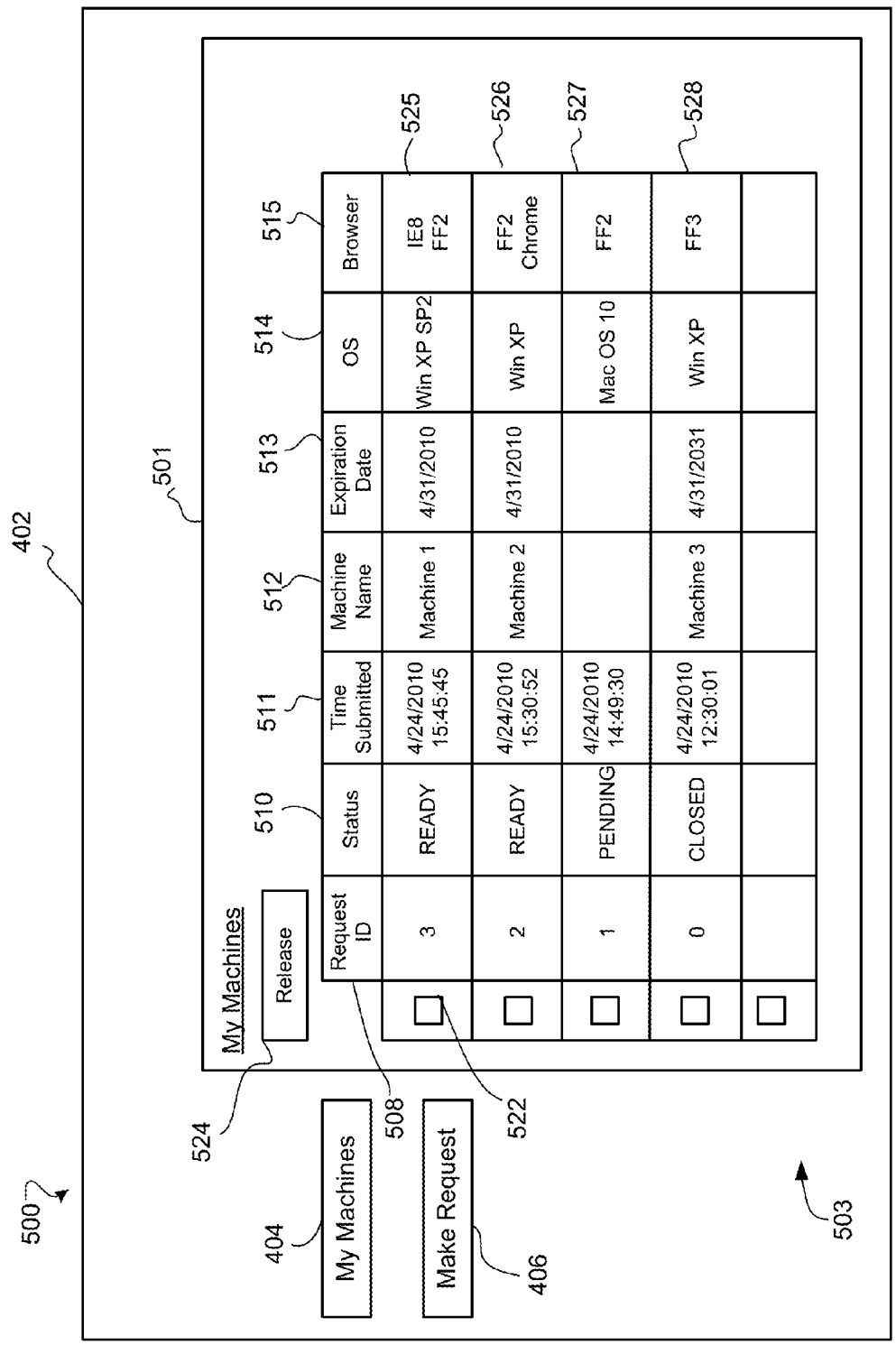
FIG. 5 is screen shot of a user interface.
Figure 6:
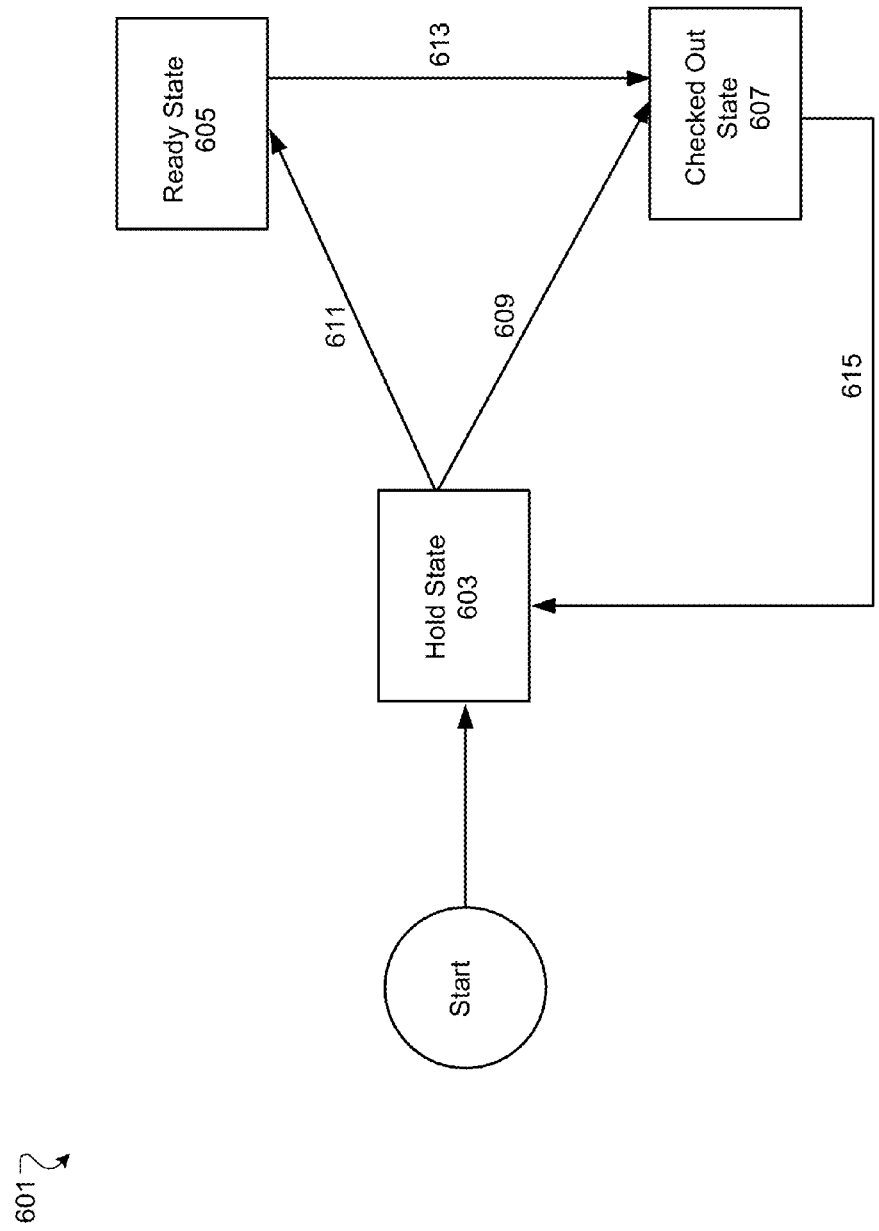
FIG. 6 shows a virtual machine state schema.

FIG. 3 is a flowchart that illustrates a process 300 for the provisioning of and access to a virtual test environment. The process 300 is described with reference to system 200, but other systems or system configurations may be used to implement process 300. The process 300 begins when the configuration server 108 receives a request from the client device 102 (for example, from client application 104) to log onto the configuration server 108 (302). If the client device 102 is authorized, the configuration server 108 may then receive a request from the client device 102 for access to a virtual test environment (304). As shown in FIGS. 5 and 6, the request can be generated using the web-based user interface 109 hosted by the configuration server 108 or another suitable network device. The request includes one or more configuration options which a user or application may designate as desired or necessary in the requested virtual test environment. Exemplary configuration options and techniques for selecting them are also illustrated in FIGS. 5 and 6.

After the configuration server 108 has received the request, the configuration server will determine which (if any) configuration options have been specified in the request (304, 306). In some examples, this determination can include comparing the selected configuration options to a list of configuration options that can be provided by the lab manager 113a. The determination can also include checking both the request and its contents for errors.

Then configuration server 108 determines whether sufficient resources are available to service the request (308). For example, in order to provide a client device 102 with a virtual testing environment, the configuration server 108 may first determine whether the virtual machine host 114a contains any free "slots" (e.g., by determining whether the virtual machine host 114a is capable of hosting an additional virtual machine (e.g., because there are a threshold level of computing resources available), or whether the virtual machine host can reboot an unused virtual machine 116a-c with an image that satisfies the configuration options specified in the request). In some examples, the configuration server 108 may determine whether resources are available to support an additional virtual machine by querying one or more lab managers and/or virtual machine hosts to determine usage levels, or by referring to an internal database that tracks the availability and/or usage of computing resources. In some examples, there are insufficient computing resources available to service the request. In those cases, different forms of queue management 204 can be implemented in order to service the requests fairly and efficiently. An exemplary queue management technique will be described in greater detail below with reference to FIG. 7.

After it has been determined that sufficient resources exist to service the request, the configuration server instructs lab manager 113a to provision a virtual test environment that satisfies the request. In order to provision a test environment that satisfies the request, the lab manager 113a loads or reboots in the virtual machine host 114a an image that corresponds to the configuration options specified in the request (310). For example, if the client device issues a request that requires a virtual test environment that includes the Windows XP®, operating system, the Google Chrome® web browser, and an Intel® CPU, the lab manager 113a will boot a virtual machine 116a on the virtual machine host 114a from an image 206a that corresponds to the specified requirements. The loading process may involve the lab manager 113a rebooting an existing virtual machine from an appropriate image, and is sometimes referred to as the "imaging" process. The imaging process may include communications between the lab manager 113a and the virtual machine host 114a and/or the virtual machines using the Secure Shell (SSH), Dynamic Host Configuration Protocol (DHCP), the Bootstrap Protocol (BOOTP), Trivial File Transfer Protocol (TFTP), Network File System (NFS).

After a virtual machine has been booted (or rebooted) with the appropriate image, the virtual machine host 114a notifies the lab manager 113a that the operation has been completed. Identifying information is assigned to the virtual machine (312). The identifying information includes, for example, a machine name, an internet protocol address, or port information. The lab manager 113a can assign and retrieve identifying information by exchanging messages with the virtual machine host 114a and/or the virtual machines using the protocols identified above. In some examples, the identifying information can be dynamically assigned to virtual machines.

When the virtual machine hosting the requested virtual test environment is ready for use, the lab manager 113a is notified, and the identifying information associated with that virtual machine is passed to the configuration server 108. The configuration server can then provide access to the virtual machine to the client device 102. The configuration server can provide access to the virtual machine to the client device by, for example, forwarding, to the client device, a port associated with the virtual machine, an internet protocol address associated with the virtual machine, or a machine name associated with the virtual machine to the configuration server.

After the client device 102 has received access to the virtual machine hosting the requested virtual test environment, the client device 102 (and any applications thereon) can run experimental applications in the test environment to evaluate the application's performance in that particular environment. For example, if a user of the client device 102 wishes to test a web-based application in an environment that includes the Windows XP®, operating system, the Google Chrome® web browser, and an Intel® CPU, the user can install the application in the virtual test environment, execute the application, and evaluate its performance during use. Applications can be installed and executed on the virtual test environment using, for example, a command line interface, APIs, or by generating a web based UI on the client device 102 in which the user can manually carry out test procedures. The API and command line interfaces can be accessed by an application without human intervention. The web UI can include a graphical representation of a computing environment (e.g., a "desktop") on the client device that can be manipulated to control the virtual test environment. The web UI can also displays the application as it is running and allow a user to interface with the running application in the environment.

In some examples, a collection of images is stored on a physical machine that is, or includes, the virtual machine host and can be loaded upon request. In some cases, this storage arrangement may minimize delay that may be associated with arrangements that, for example, store a variety of images on a central server that need to be transferred to a virtual machine host upon request. In some examples, virtual machines based on commonly requested images can be left running on the virtual machine host before a request for that virtual machine is even received. That is, once a request is received, a user may simply be provided access to a virtual machine that is already loaded and running on the virtual machine host.

In some examples, users (including administrators of the virtual test environment service) can provide their own locally stored images to the virtual machine hosts. In this way, users are able to boot virtual machines from their own custom images. This technique can be enabled by allowing users to provide the lab manager or configuration server with a file path that identifies the location of the locally stored image, either through a web user interface (described below) or by allowing an application 104 running on the client device 102 to automatically specify the location of the image using an application programmable interface. The provided image may be stored locally on the client device 102, in which case the client application 104, potentially in conjunction with the web UI 109, may upload the image to configuration server. In other instances, the provided image may be remotely stored on another device (for example, the image may be stored in a hosted, or cloud-based, storage service that is accessible across the Internet 106). In this case, an identifier of the location of the image (for example, a Uniform Resource Locator (URL)) may be provided to the configuration server 108 and the configuration server 108, or another device, may retrieve the image from the remote storage.

Once the user's own image has been made available to the lab manager, error checking can be performed on the image to ensure that the image contains bootable data. For example, the lab manager (or other entity) might scan the image to determine whether the file size exceeds a threshold, whether the image contains data that in an undesirable format, or whether the image contains any viruses or other harmful applications or data.

Figure 4:
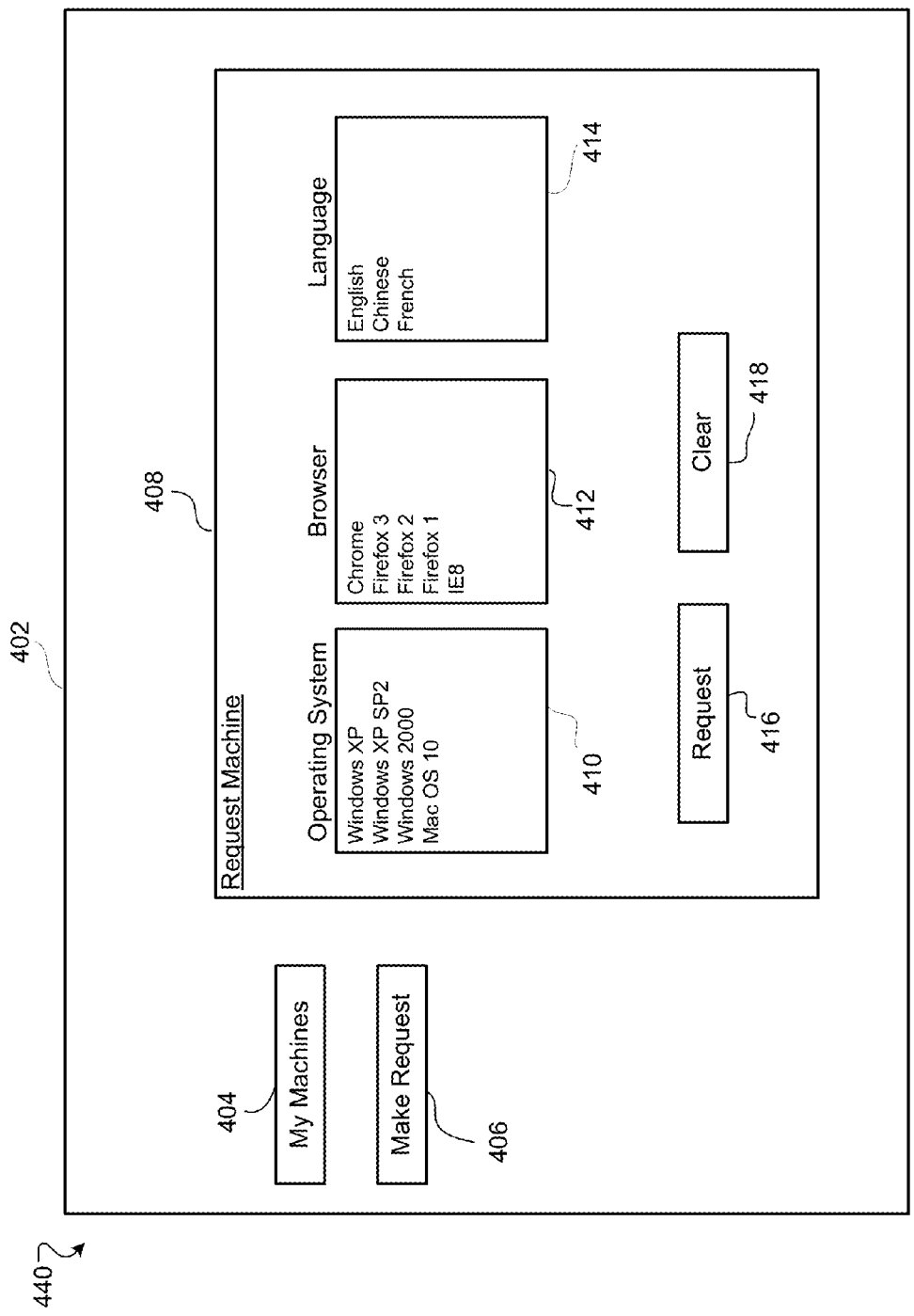
FIG. 4 is screen shot of a user interface.

FIG. 4 illustrates an example of a user interface 400 that may be used to request a virtual machine. The user interface may be provided by the web UI 109 hosted on the configuration server 108. In that case, the user interface 400 may be provided as a web page that can be accessed by a client device 102 over the Internet 106 using a web browser 402 (e.g., Google Chrome®). The user interface 400 can be configured to provide a number of different views to a user in the form of web pages. While in the example of FIG. 4 the Make Request view 406 is being displayed, the user interface 400 shows that the My Machines view 404 is also available. If a user activates the My Machines view (e.g., by clicking on an icon with a cursor), the user can be shown a different web page in the browser 402. The My Machines view 404 is shown in FIG. 5.

The user interface 400 contains a Request Machine pane 408 that includes a number of different configuration options associated with requesting a virtual test environment. In the example of FIG. 4, the Request Machine pane 408 includes various configuration options such as operating system 410, browser 412, and language 414. Any number of configuration options can be provided, such as the aforementioned "CPU" configuration option that allows a user to select a particular CPU to be emulated by the virtual machine. The operating system option 410 allows a user to choose an operating system for the virtual test environment. While in this example, the operating system can be selected from a group of operating systems consisting of Windows XP®, Windows XP SP2®, Windows 2000®, and Mac OS 10®, any operating system can be included in the group. Similarly, the browser and language options allow users to select further configuration options from groups consisting of various browsers and languages, respectively.

After a user has selected his desired configuration options, the user can elect to activate the request icon 416 or the clear icon 418. Activating the request icon 416 will cause the request to be submitted to the configuration server 108, which begins the process of provisioning a virtual test environment. Activating the clear icon 418 causes the selected menu options to be cleared, allowing the user to begin selecting options from the groups 410, 412, 414 once again.

In some examples, configuration options previously or commonly requested by a user can be stored in easily selectable snapshots. For example, if a user wanted to provision a virtual test environment having the Windows XP SP2®, operating system and the Google Chrome® browser, those configuration options could be requested upon user selection of a "package" of configuration options. These packages can be made available on the user interface by administrators of the web user interface, or can be dynamically generated based upon a user's request history. For example, if a user previously requested a virtual test environment having the Windows XP®, operating system and the Google Chrome® browser, the user interface could enable the user to request that same configuration again (e.g., with one click) by displaying the user's recent configuration selections.

Users can also specify how long they wish to have access to a requested virtual test environment, or can simply accept the default duration of, for example, twenty-four hours. If a user wishes to maintain access to a virtual test environment for a period of time longer or shorter than the default period, the user may be required to submit information that can be verified by administrators of the virtual test environment service. For example, a user may be required to submit the name of his company and the reasons for requesting a longer or shorter duration. Similar default limits can be associated with other aspects of the virtual test environment requests, such as limits on the number of virtual test environments that a user may request over a given period of time.

Referring to FIG. 5, once a client device has established one or more sessions on virtual test environments, a user interface 500 hosted by the configuration server 108 can be accessed by a user in order to manage the sessions. The user interface 500 can be a web page accessed using a web browser 402. The user interface 500 shows the "My Machines" view 404, which can be access by, for example, clicking an icon associated with the view with a cursor.

The user interface 500 includes a pane 501 that contains a table 503 and a release icon 524. The table 503 contains a number of rows 525-528 and columns 510-515 that represent the status associated with requests for a virtual test environment, as well as other information. For example, column 508 represents a request ID that can uniquely identify each request (e.g., by numbering the requests 0 to n). In some examples, such as that shown in FIG. 5, the request IDs can be assigned based on the time that the request was submitted, which is indicated in column 511. Column 512 identifies the name of the virtual machine associated with the request, while column 513 indicates when the session associated with a request is set to expire. The columns 514 and 515 represent configurations options for the virtual machine such as the type of operating system 514 and browser 515. As stated above, other configuration options are possible, and any number of configuration options can be represented by additional columns in the table 503. For example, columns can be added that show a language (e.g., English) or a CPU type associated with a particular virtual machine request.

As an example, row 525 represents a request for a virtual test environment. The request ID associated with this request is "3," and the status column 510 indicates that the virtual test environment is READY. Column 511 indicates that the request was submitted on Apr. 24, 2010 at 15:45:45, and will expire on Apr. 31, 2010, as indicated by column 513. As shown in column 512, a virtual machine having the name Machine 1 has been provisioned to run the virtual test environment, and columns 514 and 515 indicate that the virtual test environment will operate with the Windows XP SP2® operating system and Internet Explorer 8® and Firefox browsers.

Column 510 may also indicate other statuses associated with requests. For example, while the requests represented by rows 525 and 526 have a status of READY, the requests represented by rows 527 and 528 are PENDING and CLOSED, respectively. The PENDING status indicates that the request has not yet been processed and therefore a virtual machine corresponding to the requested environment is not yet available, and the CLOSED status indicates that a client device has closed a session with a virtual machine (e.g., by successfully releasing the session as described below), or that the virtual machine has been made otherwise unavailable to the client device. Sessions having the CLOSED status can be made active again through a one-click process that allows a user to renew the session with the same configuration.

A user can release a session associated with a virtual machine in order to make the computing resources supporting that session available to other users. For example, a user could toggle the radio button 522 in row 525 to select the request having request ID 3, and then activate the release icon 524. These actions would trigger a release of virtual machine Machine 1, which would free computing resources in the virtual machine host. Once the resources have been released, a user waiting in queue could have his request for a virtual test environment serviced.

In some examples, applications can request virtual test environments and do not require the use of a web user interface. That is, a client application 104 running on a client device 102 can drive the provisioning of a virtual machine by, for example, executing batch scripts that automatically call for the provisioning of one or more virtual machines. This functionality can be enabled by exposing an application programming interface (API) supported, for instance, by the configuration server 108 or the lab manager 113a. The API can be used by applications to send requests for virtual machines to the configuration server 108 or lab manager 113a, as well as use virtual machines that have been provisioned in response those requests. Furthermore, a command line interface may be provided for sending requests for virtual machines, as well as using the provisioned virtual machines. Such a command line interface may be implemented to use the API.

By allowing a client application 104 to automatically call for the provisioning of a virtual test environment, applications can be tested without the need for a user to manually manage the set up and execution of each application. This can be especially useful in situations where a large number of virtual test environments are needed and in situations where new virtual test environments are frequently requested.

Figure 7:
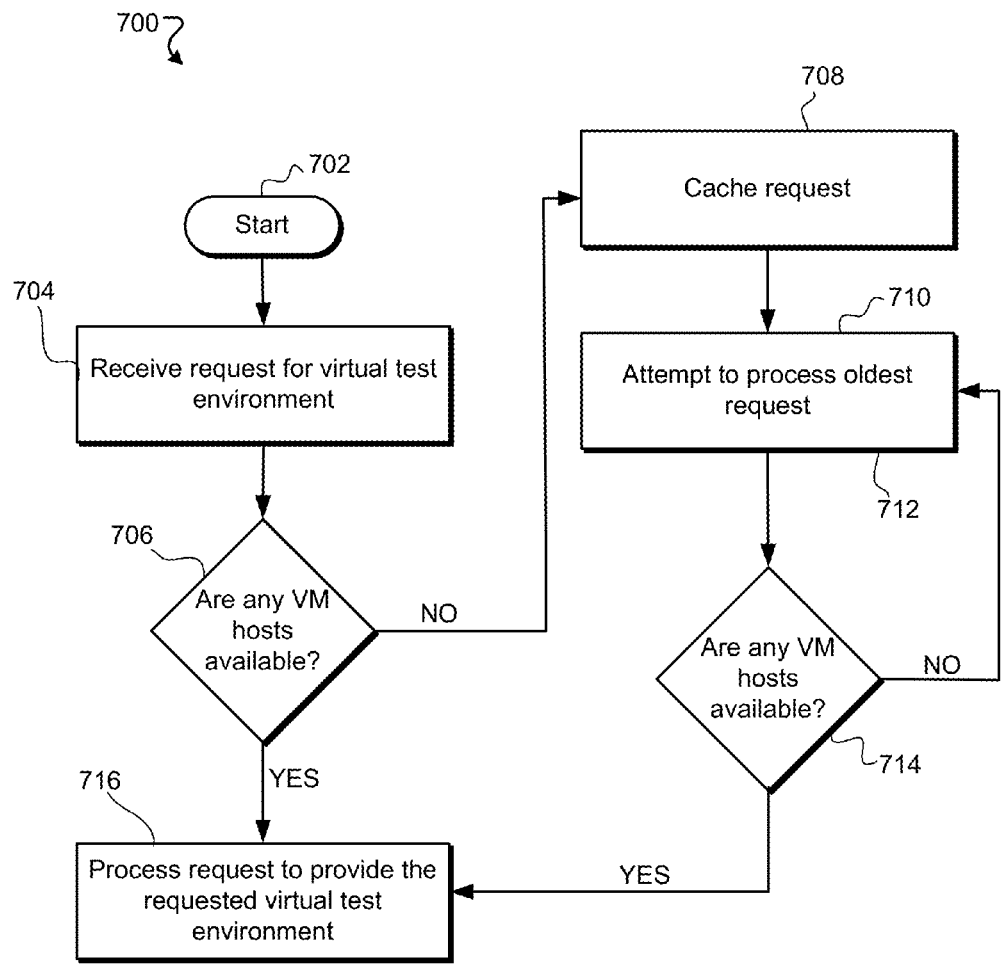
FIG. 7 is a flow chart that shows a process for managing queues of requests.

In one implementation, the configuration server 108 may implement a queue management process for handling requests. In some examples, there may not be sufficient computing resources to provide virtual test environments to all users that request access to such environments when the users request access. During such periods of high demand, the queue management process may handle the excess requests and may do so in a fair and efficient manner. FIGS. 6 and 7 are examples of how virtual machines are reserved for or assigned to users.

FIG. 6 is a virtual machine state schema 601. The schema 601 shows that in some examples the virtual machines operate in three states: a hold state 603, a ready state 605, and a checked out state 607. When a virtual machine is in the hold state 603, it can be assigned to the oldest (or "longest waiting") request in a queue of requests (609) to transition into the checked out state 607 (an example of this process is further described below with regard to FIG. 7). The virtual machine can also transition from the hold state 603 to the ready state 605 when there are no pending requests (611). In the ready state 605, the virtual machine will be assigned to whichever request is next received, and will transition to the checked out state 607 (613). The virtual machine can be released back to the hold state 603 when it has completed all of its jobs (615). In essence, the transition 609 from hold state 603 to checked out state 607 serves requests in the first-in first-served queue, and the transition 613 from ready state 605 to checked out state 607 serves requests as soon as they are received (e.g., when there are no requests in the queue, or when a newly-received request has some manner of priority).

FIG. 7 is a flowchart that illustrates an example of a process 700 for organizing, prioritizing, and eventually servicing requests. Process 700 may be employed during periods in which the demand for virtual test environments exceeds the ability of the configuration server 108 and its associated devices to provide the requested virtual environments. Process 700 can be implemented on the configuration server 108 as a queue management function 209 (FIG. 2), or can be implemented on another device within the system 100, 200.

Process 700 begins when the configuration server 108 receives 704 a request for a virtual test environment (e.g., from a client device 102) (702, 704). The configuration server 108 then determines 706 whether sufficient resources exist to service the request (e.g., by querying one or more lab managers and/or virtual machine hosts to determine usage levels, or by referring to an internal database that tracks the availability and/or usage of computing resources) (706). If the configuration server determines that sufficient computing resources exist to allow the request to be processed, the configuration server 108 begins processing the request in order to provide the requested virtual test environment (716). If the configuration server determines 706 that there are insufficient computing resources to fulfill the request, the configuration server 108 caches the request in a list of requests (708). In some examples, the list can be arranged in a first-in first-out (FIFO) format, such that requests are serviced based on how long they have been in queue (e.g., the first request serviced is the request that has been cached the longest, and so on). In some examples, priority can be given to particular requests based on group memberships, subscriptions, configuration options, or other factors.

In the example of FIG. 7, the configuration server 108 continues to attempt to service the oldest queued request (710). The attempts to service the queued request can be periodic, or can be based on a trigger, such as receipt of a message indicating that computing resources have been released or have otherwise become available for use. In attempting to service the queued request, the configuration server can again attempt to determine whether sufficient computing resources are available to process the request (714). If the available computing resources are still insufficient, the configuration server will continue to attempt to process the requests in the manner described above. If the configuration server determines that sufficient resources exist to process the request, the request is processed 716 (e.g., by provisioning and providing access to the virtual test environment specified in the request) (716).

In some examples, users or client devices can have group memberships. Allowing users to be assigned to groups enables a number of different features. For example, members of a particular group may have prioritized access to resources.

Figure 8:
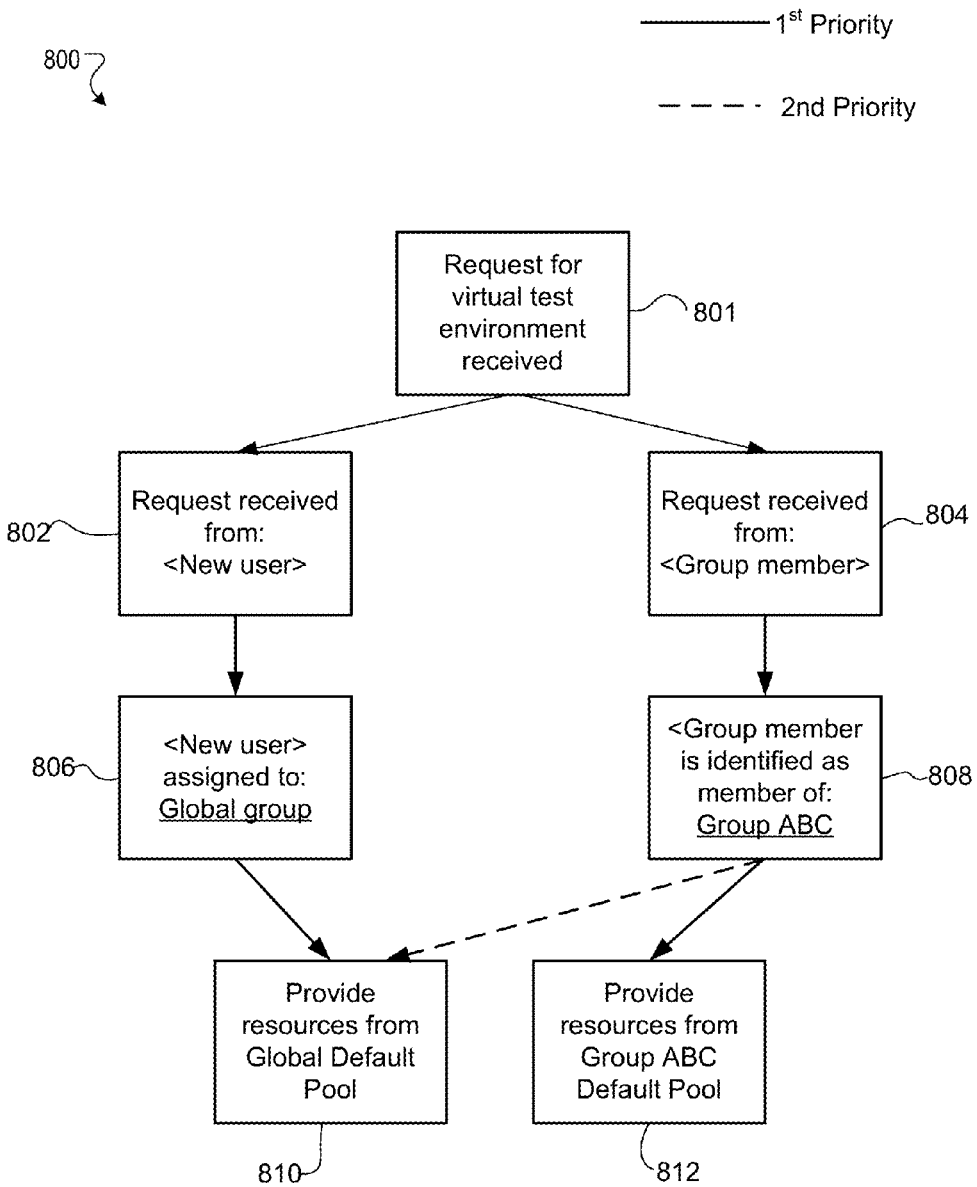
FIG. 8 is a block diagram that illustrates machine assignment based on group membership.

FIG. 8 is a flowchart of an example of a process 800 that allows users who are members of a particular group to have prioritized access to a particular pool of data centers, virtual machine hosts, or virtual machines. In general, a pool of machines is a set of machines that share the same policies (e.g., the machines have the same level of access to various services). After a request is received 801, the configuration server may determine whether the request has been received from a new user 802 or a user who is a member of a group 804. If the user is a new user (e.g., a first-time user with no group memberships), the user can be assigned to the "global group." In this case, the user is provided 810 with access to the global default pool of machines by default. If the request is received 804 from a user who is identified 808 as a member of a group (e.g., group "ABC"), the system will attempt to provide the user access to the default pool of machines for his group. In the example of FIG. 8, the Group ABC default pool is prioritized over the global default pool for users who are members of group ABC. That is, the user will be provided access to machines in the group ABC default pool and, if those machines are all busy, the user will be provided access to the machines in the global default pool.

Group membership also allows special rules to be created for virtual machines provisioned by members of a particular group. For example, while resources (e.g., virtual machines) can eventually be automatically reclaimed by the system after a set period of time (e.g., twenty-four hours), rules can be created that allow members of certain groups to maintain access to a provisioned virtual machine for a longer or shorter period of time. Members of certain groups might also have access to machines that have different levels of access to various services, networks, and systems than machines in the global default pool, and might be able to maintain access to a greater or smaller number of virtual machines.

The configuration server 108 may employ a number of functions that allow it to manage requests and connections. For example, the configuration server may be able to automatically expire and close requests according to a rule set, and can retry and reschedule requests that have failed. For example, if a request failed due to lack of available resources or due to an error, the configuration server 108 may be configured to detect such failures and either retry or reschedule the failed request. For example, the configuration server 108 can be configured to automatically re-attempt to provision a virtual machine based on a previously submitted request if that request did not succeed in provisioning a virtual machine.

Furthermore, the configuration server 108 may also detect requests that have been orphaned (e.g., pending requests that no longer require servicing) and delete them using special service jobs.

In addition to cleaning up orphaned and failed requests, the configuration server can also provide tools for monitoring usage and tracking statistics related to the virtual test environments. These tools can include programs for visually displaying and characterizing data both historically and in real time.

FIGS. 9A, 9B, 9C, and 9D are screen shots showing examples of user interfaces that show a visualized monitoring system that can be accessed, for example, by administrators of the virtual test environment service.

Figures 9A, 9B:
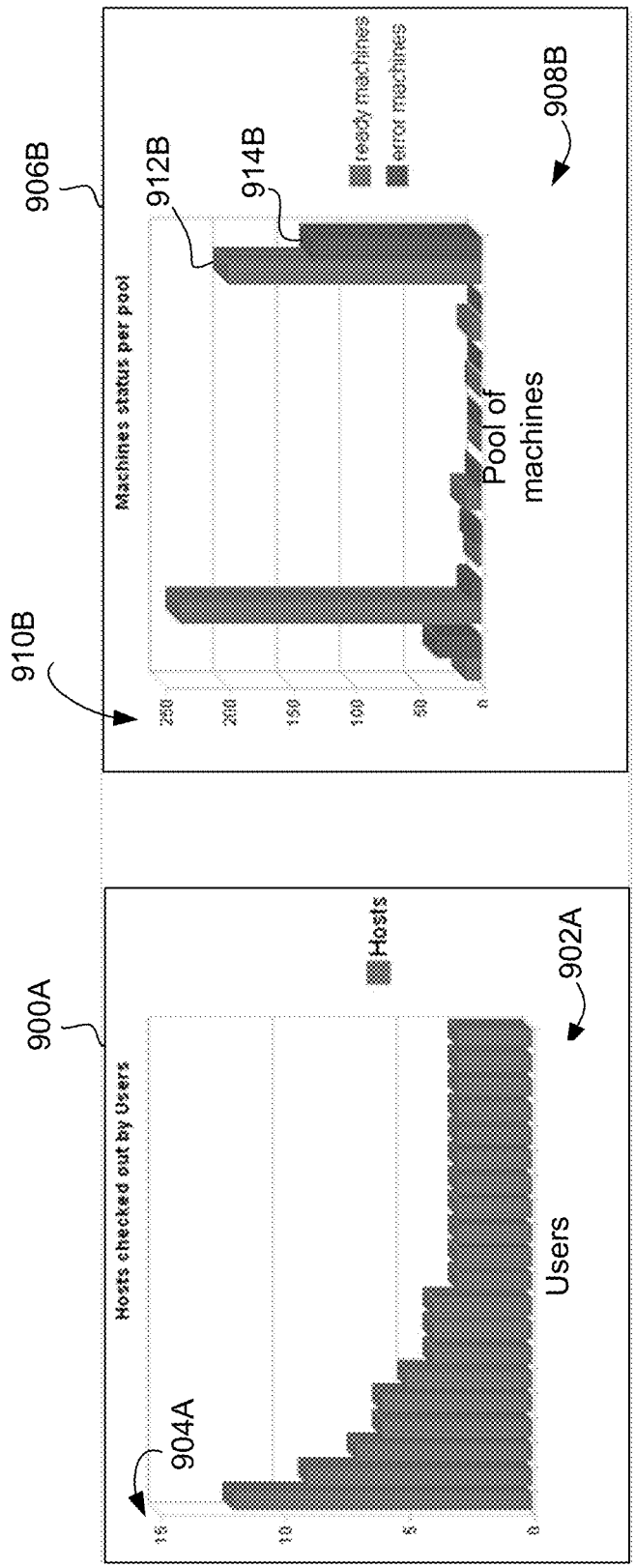

FIG. 9A is a screenshot 900A that illustrates the numbers of virtual machines (hosts) 904A (y-axis) checked out to a number of different individual users 902A (x-axis). FIG. 9B is a screenshot 906B that illustrates the number of available virtual machines 910B available in a particular pool of machines 908B. The screenshot also illustrates the number of virtual machines that are ready to be used 912B, and the number of virtual machines that have an error 914B of some kind.

Figure 9D:
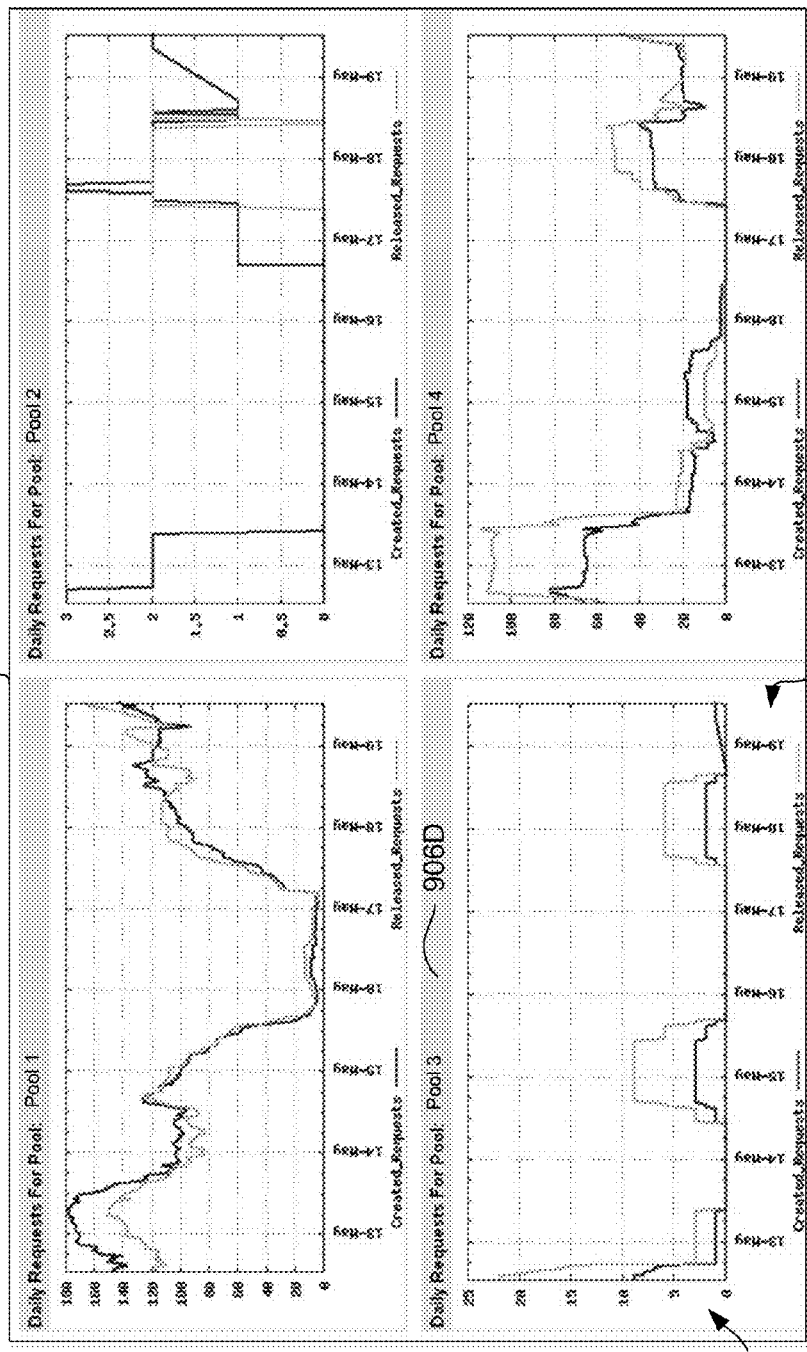

FIG. 9C is a screenshot 900C that illustrates two different lists. The first list of users 902C displays the "top 20" users having the most sessions established with virtual machines. The list also displays the number of virtual machines being provided to each of the top 20 users on the list. Lists of this sort can be provided for any other desirable statistic, such as the top 20 users with the most requests over the previous week. The second list of users 904C is empty, but is configured to display a queue of pending requests. In the example of FIG. 9C, the list is empty because there are no pending requests. FIG. 9D is a screenshot 900D that illustrates how many requests 904D various pools of machines 906D have received over a given period of time 902D. These graphs can also display representations of current requests using real-time data feeds.

While some of the visualization tools described above display data in graph form, any suitable visual organization of data can be used (e.g., line graphs, pie charts, charts, tables, and the like). Furthermore, audible alarms can be configured to sound upon the occurrence of an event relating to the data. Similar visualization tools can be made available to users of client devices that pertain to their own resource usage.

Figure 10:
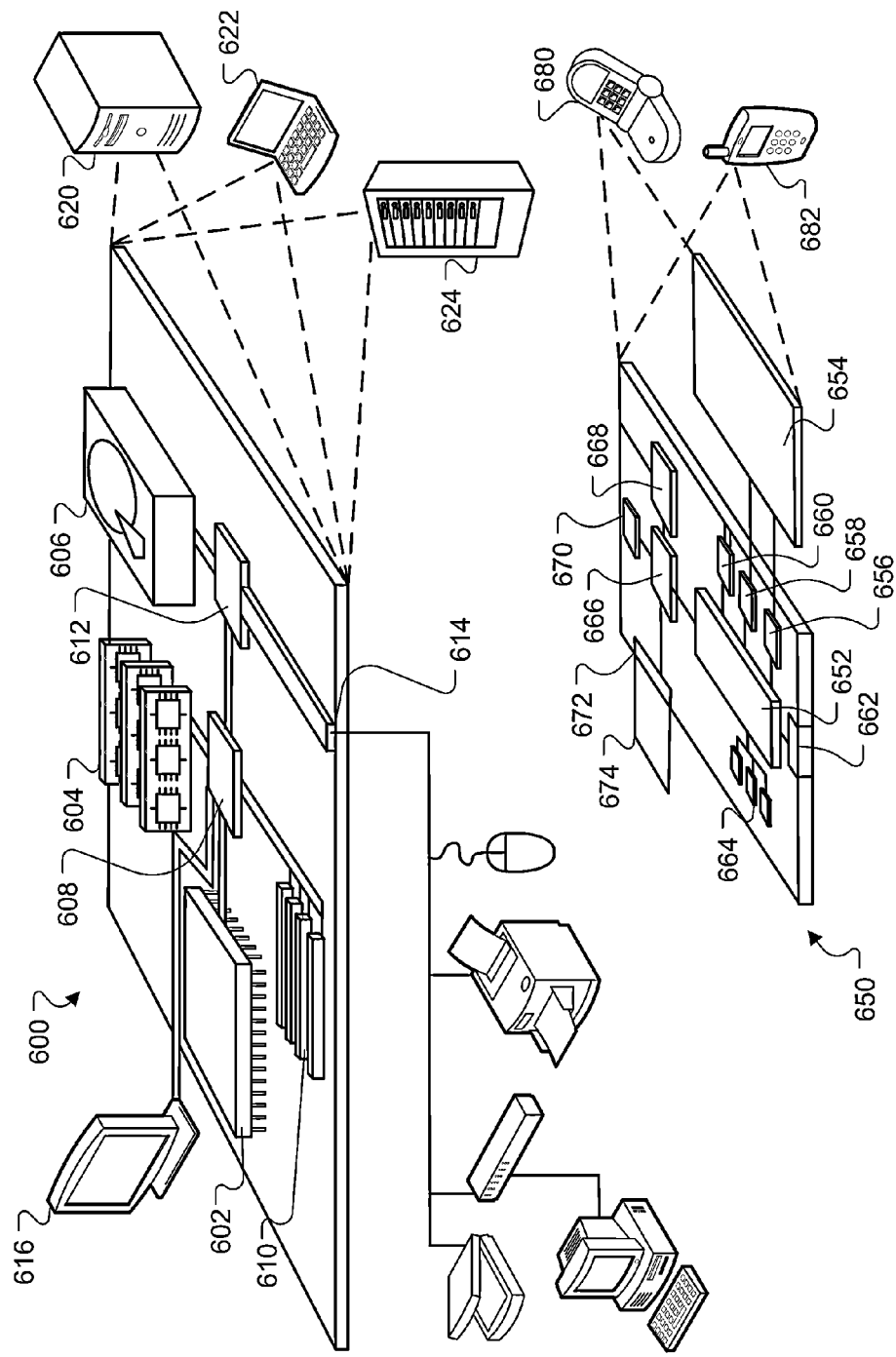
FIG. 10 is a block diagram of a computing system.

FIG. 10 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer implemented method for providing access to a virtual test environment, the method comprising:
    receiving, at a configuration server, a first request for access to a first virtual test environment, the first request being received from a first client device over a network and specifying one or more configuration options associated with the first virtual test environment;
    determining that a user of the first client device belongs to a first group out of multiple groups;
    selecting a first pool of resources based on the user of the first client device belonging to the first group, wherein the first pool of resources are available to members of the first group but not available to members of a second group out of the multiple groups;
    provisioning, using the selected first pool of resources, a first virtual machine that comprises the first virtual test environment, the first virtual test environment comprising features associated with the one or more configuration options associated with the first virtual test environment;
    providing the first client device access to the first virtual test environment;
    receiving, at the configuration server, a second request for access to a second virtual test environment, the second request being received from a second client device over a network and specifying one or more configuration options associated with the second virtual test environment;
    determining that a user of the second client device belongs to the second group;
    selecting a second pool of resources based on the user of the second client device belonging to the second group, wherein the second pool of resources are available to members of the first group and to members of the second group;
    provisioning, using the selected second pool of resources, a second virtual machine that comprises the second virtual test environment, the second virtual test environment comprising features associated with the one or more configuration options associated with the second virtual test environment, wherein provisioning the second virtual machine comprises determining whether a threshold level of resources in the second pool is available to provision the second virtual machine; and
    adding the second request to a queue of requests if the threshold level of resources in the second pool is not available to provision the second virtual machine.

2. The method of claim 1 further comprising:
    providing the second client device access to the second virtual test environment.

3. The method of claim 2, further comprising:
    terminating access to the first virtual machine after expiration of a first allowed access time, the first allowed access time specifying a length of time for which the first client device may access the first virtual machine; and
    terminating access to the second virtual machine after expiration of a second allowed access time specifying a length of time for which the second client device may access the second virtual machine;
    wherein the first allowed access time is longer than the second allowed access time as a result of the first user belonging to the first group and the second user belonging to the second group.

4. The method of claim 1, wherein providing the first client device access to the first virtual test environment comprises forwarding, to the first client device, a port associated with the first virtual machine, an internet protocol address associated with the first virtual machine, or a machine name associated with the first virtual machine.

5. The method of claim 1, wherein provisioning the first virtual machine comprises instructing a virtual machine host to boot a virtual machine based on an image that corresponds to the configuration options.

6. The method of claim 5, wherein the images are stored on the virtual machine host.

7. A computer storage device comprising instructions that, when executed by one or more processing devices associated with a configuration server, cause the one or more processing devices to perform operations comprising:
    receiving, at a configuration server, a first request for access to a first virtual test environment, the first request being received from a first client device over a network and specifying one or more configuration options associated with the first virtual test environment;
    determining that a user of the first client device belongs to a first group out of multiple groups;
    selecting a first pool of resources based on the user of the first client device belonging to the first group, wherein the first pool of resources are available to members of the first group but not available to members of a second group out of the multiple groups;

provisioning, using the selected first pool of resources, a first virtual machine that comprises the first virtual test environment, the first virtual test environment comprising features associated with the one or more configuration options associated with the first virtual test environment; and providing the first client device access to the first virtual test environment receiving, at the configuration server, a second request for access to a second virtual test environment, the second request being received from a second client device over a network and specifying one or more configuration options associated with the second virtual test environment;

determining that a user of the second client device belongs to the second group;

selecting a second pool of resources based on the user of the second client device belonging to the second group, wherein the second pool of resources are available to members of the first group and to members of the second group;

provisioning, using the selected second pool of resources, a second virtual machine that comprises the second virtual test environment, the second virtual test environment comprising features associated with the one or more configuration options associated with the second virtual test environment, wherein provisioning the second virtual machine comprises determining whether a threshold level of resources in the second pool is available to provision the second virtual machine;

adding the second request to a queue of requests if the threshold level of resources in the second pool is not available to provision the second virtual machine.

8. The computer storage device of claim 7 further comprising instructions to cause the one or more processing devices to perform operations comprising:
providing the second client device access to the second virtual test environment.

9. The computer storage device of claim 8, further comprising instructions to cause the one or more processing devices to perform operations comprising:
terminating access to the first virtual machine after expiration of a first allowed access time, the first allowed access time specifying a length of time for which the first client device may access the first virtual machine; and
terminating access to the second virtual machine after expiration of a second allowed access time specifying a length of time for which the second client device may access the second virtual machine;
wherein the first allowed access time is longer than the second allowed access time as a result of the first user belonging to the first group and the second user belonging to the second group.

10. The computer storage device of claim 7, wherein providing the first client device access to the first virtual test environment comprises forwarding, to the first client device, a port associated with the first virtual machine, an internet protocol address associated with the first virtual machine, or a machine name associated with the first virtual machine.

11. The computer storage device of claim 7, wherein provisioning the first virtual machine comprises instructing a virtual machine host to boot a virtual machine based on an image that corresponds to the configuration options.

12. The computer storage device of claim 11, wherein the images are stored on the virtual machine host.

13. A configuration server configured to:
receive a first request for access to a first virtual test environment, the first request being received from a first client device over a network and specifying one or more configuration options associated with the first virtual test environment;

determine that a user of the first client device belongs to a first group out of multiple groups;

select a first pool of resources based on the user of the first client device belonging to the first group, wherein the first pool of resources are available to members of the first group but not available to members of a second group out of the multiple groups;

provision, using the selected first pool of resources, a first virtual machine that comprises the first virtual test environment, the first virtual test environment comprising features associated with the one or more configuration options associated with the first virtual test environment;

provide the first client device access to the first virtual test environment receive a second request for access to a second virtual test environment, the second request being received from a second client device over a network and specifying one or more configuration options associated with the second virtual test environment;

determine that a user of the second client device belongs to the second group;

select a second pool of resources based on the user of the second client device belonging to the second group, wherein the second pool of resources are available to members of the first group and to members of the second group;

provision, using the selected second pool of resources, a second virtual machine that comprises the second virtual test environment, the second virtual test environment comprising features associated with the one or more configuration options associated with the second virtual test environment wherein provisioning the second virtual machine comprises determining whether a threshold level of resources in the second pool is available to provision the second virtual machine; and add the second request to a queue of requests if the threshold level of resources in the second pool is not available to provision the second virtual machine.

14. The configuration server of claim 13, wherein the configuration server is further configured to:
provide the second client device access to the second virtual test environment.

15. The configuration server of claim 14, wherein the configuration server is further configured to:
terminate access to the first virtual machine after expiration of a first allowed access time, the first allowed access time specifying a length of time for which the first client device may access the first virtual machine; and
terminate access to the second virtual machine after expiration of a second allowed access time specifying a length of time for which the second client device may access the second virtual machine;
wherein the first allowed access time is longer than the second allowed access time as a result of the first user belonging to the first group and the second user belonging to the second group.

16. The configuration server of claim 13, wherein providing the first client device access to the first virtual test environment comprises forwarding, to the first client device, a port associated with the first virtual machine, an internet protocol address associated with the first virtual machine, or a machine name associated with the first virtual machine.

17. The configuration server of claim 13, wherein provisioning the first virtual machine comprises instructing a virtual machine host to boot a virtual machine based on an image that corresponds to the configuration options.

18. The configuration server of claim 17, wherein the images are stored on the virtual machine host.

\* \* \* \* \*